(12) United States Patent
Takizawa

(10) Patent No.: US 11,109,311 B2
(45) Date of Patent: Aug. 31, 2021

(54) RADIO RELAY APPARATUS, AND TEMPERATURE CONTROL METHOD FOR THE SAME

(71) Applicant: JVCKENWOOD Corporation, Yokohama (JP)

(72) Inventor: Keiko Takizawa, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 15 days.

(21) Appl. No.: 16/804,012

(22) Filed: Feb. 28, 2020

(65) Prior Publication Data

US 2020/0305074 A1  Sep. 24, 2020

(30) Foreign Application Priority Data

Mar. 20, 2019  (JP) .............................. JP2019-053778

(51) Int. Cl.
*H04W 24/04* (2009.01)
*H04W 52/02* (2009.01)
*H04W 24/08* (2009.01)
*H04W 88/08* (2009.01)

(52) U.S. Cl.
CPC ....... *H04W 52/0206* (2013.01); *H04W 24/08* (2013.01); *H04W 88/08* (2013.01)

(58) Field of Classification Search
CPC . H04W 52/0206; H04W 24/08; H04W 88/08; H04W 88/085; H04W 24/04; H04W 24/02; Y02D 30/70; H04L 1/22; H04L 69/14; H03F 1/52
See application file for complete search history.

(56) References Cited

FOREIGN PATENT DOCUMENTS

JP        2010-206259      9/2010
JP        2010206259  A  *  9/2010

* cited by examiner

*Primary Examiner* — Said M Elnoubi
(74) *Attorney, Agent, or Firm* — Amin, Turocy & Watson, LLP

(57) ABSTRACT

In a base station, in cases where a repeater device capable of performing radio communication with a communication terminal is in a control channel state to control entire communication, a site controller determines whether an internal temperature of the repeater device is equal to or higher than a preset first temperature threshold, and when the internal temperature of the repeater device is equal to or higher than the first temperature threshold, the site controller brings the repeater device from the control channel state to an unavailable state, after bringing another repeater device that is in an idle state where nothing is processed, to the control channel state. Thereafter, when the internal temperature of the repeater device becomes equal to or lower than a preset second temperature threshold and when a predetermined time is elapsed, the site controller brings the repeater device from the unavailable state to the idle state.

8 Claims, 9 Drawing Sheets

FIG.5

| REPEATER ID | STATE | TEMPERATURE (°C) | ELAPSED TIME AFTER STATE CHANGE (MINUTE) |
|---|---|---|---|
| 1 | CONTROL CHANNEL | 50 | 120 |
| 2 | COMMUNICATION CHANNEL | 40 | 5 |
| 3 | IDLE | 35 | 60 |

FIG.6

| REPEATER ID | STATE | TEMPERATURE (°C) | ELAPSED TIME AFTER STATE CHANGE (MINUTE) |
|---|---|---|---|
| 1 | CONTROL CHANNEL | 80 | 125 |
| 2 | COMMUNICATION CHANNEL | 40 | 10 |
| 3 | IDLE | 35 | 65 |

FIG.7

| REPEATER ID | STATE | TEMPERATURE (°C) | ELAPSED TIME AFTER STATE CHANGE (MINUTE) |
|---|---|---|---|
| 1 | UNAVAILABLE | 80 | 0 |
| 2 | COMMUNICATION CHANNEL | 40 | 10 |
| 3 | CONTROL CHANNEL | 35 | 0 |

FIG.8

| REPEATER ID | STATE | TEMPERATURE (°C) | ELAPSED TIME AFTER STATE CHANGE (MINUTE) |
|---|---|---|---|
| 1 | IDLE | 60 | 5 |
| 2 | COMMUNICATION CHANNEL | 40 | 15 |
| 3 | CONTROL CHANNEL | 50 | 5 |

RADIO RELAY APPARATUS, AND TEMPERATURE CONTROL METHOD FOR THE SAME

CROSS-REFERENCE TO RELATED APPLICATION

This application claims priority from Japanese Application No. 2019-053778, filed on Mar. 20, 2019, the contents of which are incorporated by reference herein in its entirety.

BACKGROUND

1. Technical Field

The present disclosure relates to a temperature control method for a radio relay apparatus.

2. Description of the Related Art

In a radio communication system for providing telecommunication services to portable communication terminals, etc., a plurality of repeater devices are arranged and operated in a base station. Then, one of the repeater devices acts as a repeater device (CCH) that plays a role of a control channel for notifying the communication terminals (mobile stations) of base station information, and the others become repeater devices (TCHs) that play a role of communication channels for relaying a call. With this method, a site controller determines a channel used for communication between the communication terminals, and the CCH controls the TCHs by notifying the communication terminals of the determined channel, and allowing the communication terminals to use the determined channel. Because the CCH continuously transmits a control signal as mentioned above, the deterioration of the repeater device has been prevented by changing or replacing, at a certain time interval, the role of the CCH with one of the THCs, which is in an idle state at that point in time.

However, the change of the role according to the time interval cannot deal with a rapid temperature rise in the repeater device (CCH), resulting in a hang-up of the repeater device. For example, in cases where the temperature of the repeater device, which acts as a control channel, rises to an abnormal temperature (about 85° C.), the repeater device stops transmission without informing to the communication terminals in the system, while displaying an error message, and thereafter, a repeater device of another channel is actuated as a repeater device of a control channel.

This temperature rise is induced by various factors such as a change in the ambient temperature of the repeater device, a change in the transmission output, the number of communication terminals to be controlled, but in contrast to this, the change timing of the control channel is only a designated point in time, or a designated point in time and a constant period (1 hour at the shortest). For this reason, there has been required a technique that prevents the hang-up of the repeater devices beforehand by temperature monitoring, thereby maintaining a call function.

For example, Japanese Laid-open Patent Publication No. 2010-206259 A discloses a technique in which the internal temperatures of a plurality of repeater devices are monitored, and in the selection of a repeater device that plays a role of a communication channel (relay channel) for the relay of a call and/or data communication, a repeater device, the relay channel of which is in an idle state and that is at a low internal temperature, is selected, whereby the failure of the repeater device due to the temperature rise is prevented beforehand.

Japanese Laid-open Patent Publication No. 2010-206259 A illustrates an example of a method in which the operation of the control channel is not concentrated on a specific repeater device, but on the other hand, there also exists a method in which the operation of the control channel is concentrated on a specific repeater device. In this case, the repeater device playing a role of the control channel continues to transmit a control signal in a continuous manner, so the internal temperature of the repeater device rises easily.

In addition, the method described in Japanese Laid-open Patent Publication No. 2010-206259 A is a technique for selecting a repeater device of a "relay channel" that plays a roll of subsequently performing transmission and reception, and refers to the internal temperatures of other repeater devices as a selection criterion. Accordingly, the repeater device playing a role of a control channel continuously to perform transmission does not measure or judge a timing at which the role is made to transfer. Moreover, it is preferable not to use the repeater device the internal temperature of which has risen rapidly, until the internal temperature returns to a normal range, and it is necessary to stop and restore the repeater device with its internal temperature raised, while maintaining the function of a base station.

SUMMARY

It is an object of the present disclosure to at least partially solve the problems in the conventional technology.

In order to solve the above-mentioned problems and to achieve the above-mentioned object, a radio relay apparatus according to the present disclosure includes: a repeater device including a processing unit capable of performing radio communication with a communication terminal, and capable of switching a channel state, and a temperature measuring unit configured to measures a temperature; and a site controller configured to manage a state of a channel (repeater device) of a base station and communication; in which in cases where the repeater device is in a control channel state to control entire communication, and an internal temperature of the repeater device is equal to or more than a first temperature threshold, the site controller brings the repeater device from the control channel state to an unavailable state.

In addition, before bringing the repeater device from the control channel state to the unavailable state, the site controller brings another repeater device that is not set to the control channel state or a communication channel state (during a call) and is in an idle state that is not the unavailable state, to the control channel state.

Moreover, the site controller allows the repeater device to notify the mobile station of the fact that the other repeater device is brought to the control channel state to be in the control channel state, and thereafter brings the repeater device from the control channel state to the unavailable state.

Furthermore, in cases where the internal temperature of the repeater device in the unavailable state is equal to or less than a second temperature threshold, and a predetermined time has elapsed after the repeater device is brought to the unavailable state, the site controller brings the repeater device from the unavailable state to the idle state.

Furthermore, when a timer interrupt based on a preset timer time occurs, in cases where among a plurality of repeater devices, there exist repeater devices each in the idle state, the site controller may bring a repeater device in the idle state, the internal temperature of which is the lowest, to the control channel state.

In addition, when the state of the repeater device changes, the site controller may initialize the value of an elapsed time after a change of the state, and start a new count.

Moreover, the site controller may store therein the number of times for the past assignment of the repeater device to the control channel state, and the highest temperature at that time.

With this configuration, when the switching timing of the repeater device at assignment of the control channel is determined, the internal temperature of the repeater device can be monitored in a continuous manner, so that the switching of the repeater device can be carried out before the internal temperature of the repeater device reaches an abnormal value, and at the same time, the repeater device can be unavailable until the internal temperature thereof becomes equal to or less than a safe value.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 5 is a diagram illustrating an example of a pattern in which each repeater device is in a normal state;

FIG. 6 is a diagram illustrating an example of a pattern in which it is detected that an internal temperature of a repeater device of a control channel becomes high, thereby approaching an abnormal temperature;

FIG. 7 is a diagram illustrating an example of a pattern in which a control channel is switched from one repeater device to another repeater device;

FIG. 8 is a diagram illustrating an example of a pattern of restoring a repeater device having a high temperature as the temperature thereof becomes lower;

DESCRIPTION OF THE PREFERRED EMBODIMENTS

Hereinafter, an embodiment according to the present disclosure will be described with reference to the attached drawings. Here, note that the present disclosure is not limited by this embodiment. In addition, when there are a plurality of embodiments, the present disclosure encompasses any configuration obtained by combining the embodiments.

Embodiment

Figure 1:
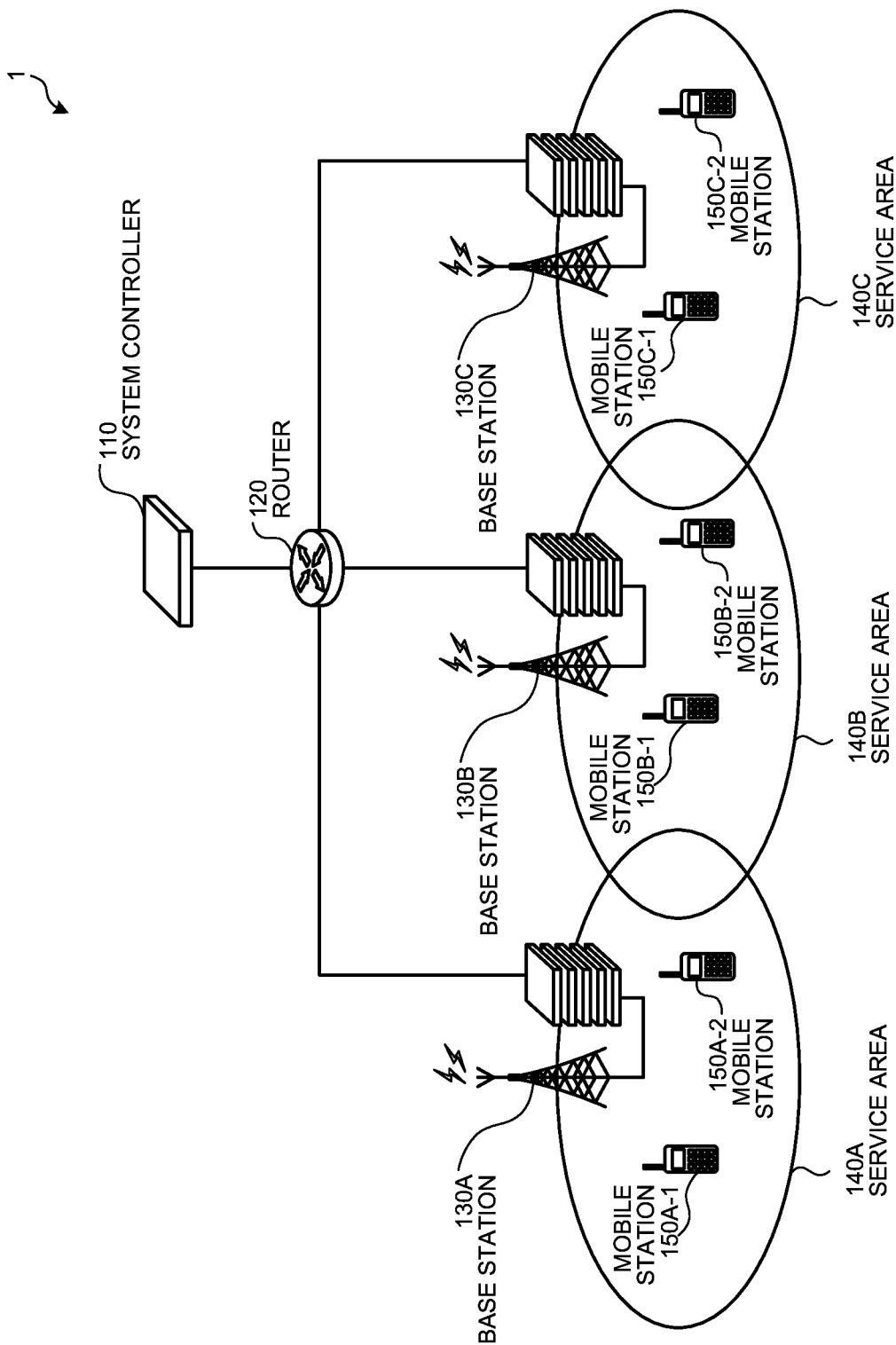
FIG. 1 is a schematic diagram illustrating an example of a configuration of a radio communication system according to an embodiment of the present disclosure.

A configuration of a radio communication system according to the embodiment of the present disclosure will be explained with reference to FIG. 1. FIG. 1 is a schematic diagram illustrating an example of the configuration of the radio communication system according to the embodiment of the present disclosure.

As illustrated in FIG. 1, a radio communication system 1 according to this embodiment includes a system controller 110, a router 120, and a first base station 130A, a second base station 130B, a third base station 130C, a first mobile station 150A-1, a second mobile station 150A-2, a third mobile station 150B-1, a fourth mobile station 150B-2, a fifth mobile station 150C-1, and a sixth mobile station 150C-2.

In FIG. 1, a first service area 140A is a communication area (communication range) in which communication can be made with the first base station 130A via radio. A second service area 140B is a communication area in which communication can be made with the second base station 130B via radio. A third service area 140C is a communication area in which communication can be made with the third base station 130C via radio. In the example illustrated in FIG. 1, in the first service area 140A, the first mobile station 150A-1 and the second mobile station 150A-2 can communicate with the first base station 130A via radio. In the second service area 140B, the third mobile station 150B-1 and the fourth mobile station 150B-2 can communicate with the second base station 130B via radio. In the third service area 140C, the fifth mobile station 150C-1 and the sixth mobile station 150C-2 can communicate with the third base station 130C via radio. Here, note that in FIG. 1, three base stations (radio relay apparatuses) and six mobile stations (radio communication terminals) are illustrated, but these are merely exemplary, and do not limit the present disclosure. Thus, there should just be at least one base station and at least one mobile station. In addition, hereinafter, the first base station 130A through the third base station 130C may also each be generically referred to as a base station 130. Similarly, the first service area 140A through the third service area 140C may also each be generically referred to as a service area 140. Further, the first mobile station 150A-1 through the sixth mobile station 150C-2 may also each be generically referred to as a mobile station 150.

The system controller 110, the router 120, and the first base station 130A through the third base station 130C are mutually connected with one another through a network such as an IP (Internet Protocol) network. In the example illustrated in FIG. 1, the single system controller 110 manages a plurality of base stations including the first base station 130A through the third base station 130C through the router 120. However, this is merely an example, and in the present disclosure, there may exist a plurality of system controllers 110. In addition, at least one base station of the first base station 130A through the third base station 130C may be provided with the function of the system controller 110. That is, the system controller 110 and a base station 130 may be constituted by an integrated device. The router 120 is a general relay device which constitutes a network, and a detailed explanation thereof is omitted here.

Base Station

Figure 2:
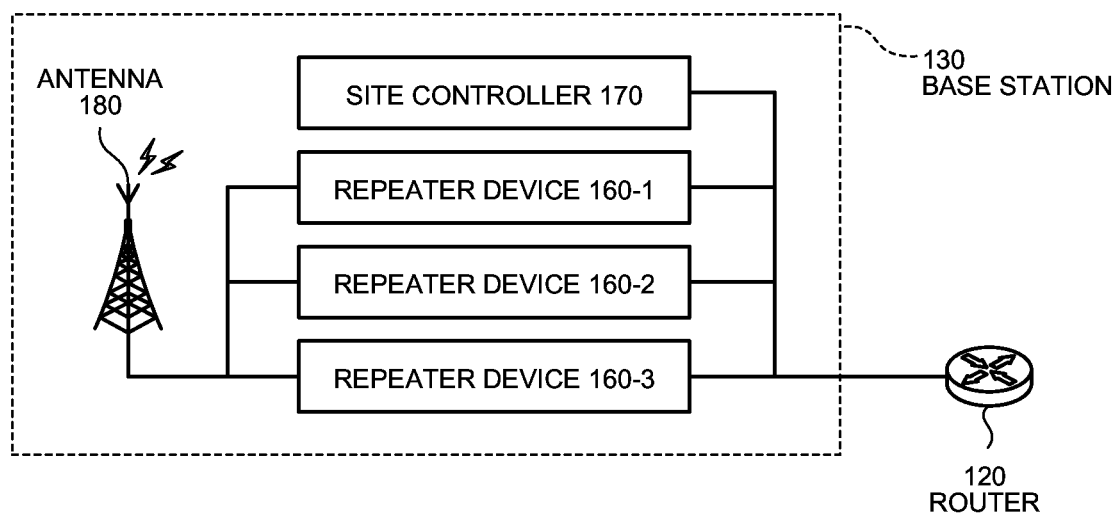
FIG. 2 is a block diagram illustrating an example of a configuration of a base station according to the embodiment of the present disclosure.

The configuration of a base station will be explained with reference to FIG. 2. FIG. 2 is a block diagram illustrating an example of the configuration of the base station.

As illustrated in FIG. 2, a base station 130 includes a first repeater device 160-1, a second repeater device 160-2, a third repeater device 160-3, a site controller 170, and an antenna 180. The configuration of the base station 130 illustrated in FIG. 2 is common in all of the first base station 130A through the third base station 130C. Here, note that in FIG. 2, three repeater devices are illustrated, but these are merely exemplary, and do not limit the present disclosure. In actuality, there may be four or more repeater devices. In addition, hereinafter, the first repeater device 160-1 through the third repeater device 160-3 may each be generically referred to as a repeater device 160. Also, a repeater device may serve the function of the site controller. That is, the site controller may be integrated with a repeater device. In actuality, at least one of the repeater devices may serve the function of the site controller. In that case, no independent site controller is required.

The first repeater device 160-1, the second repeater device 160-2 and the third repeater device 160-3 can respectively communicate through the antenna 180 with the mobile stations 150 in the service area 140 via radio. In addition, the first repeater device 160-1, the second repeater device 160-2 and the third repeater device 160-3 are respectively connected to the router 120 by a network such as an IP network, etc. The site controller 170 is connected to the first repeater device 160-1, the second repeater device 160-2 and the third repeater device 160-3, respectively. Here, note that the site controller 170 may be provided with the function of the system controller 110. For example, the site controller 170 may communicate through the router 120 with the individual repeater devices 160 of another base station 130, so that it may also manage these repeater devices. Alternatively, the site controller 170 may be installed at the side of the system controller 110. That is, the system controller 110 may function as the site controller 170.

The first repeater device 160-1, the second repeater device 160-2 and the third repeater device 160-3 are in different states (modes), respectively, and serve different roles (functions). The site controller 170 monitors the respective states of the first repeater device 160-1, the second repeater device 160-2 and the third repeater device 160-3, and switches the states or roles of the respective repeater devices 160 according to situations. As an example of the state of a repeater device 160, there is mentioned a "control channel", a "communication channel", an "idle", an "inhibition of use (unavailable)", or the like. The "control channel" is a state of controlling entire communication, where a repeater device 160 transmits radio waves to mobile stations 150 on a regular basis thereby to make notification of the existence of a base station 130 and to provide a service area 140. In the control channel, the repeater device 160 frequently or continuously transmits radio waves toward the mobile stations 150, and hence, the internal temperature of the repeater device 160 goes up easily. The "communication channel" is a state where the repeater device 160 is relaying calls (including data communication, too) of the mobile stations 150 within the service area 140. The communication channel may be replaced with a "relay channel". The "idle" is a state where the repeater device 160 is performing no processing. By bringing the repeater device 160 into the idle state, it is possible to make the repeater device 160 stand by without applying a load thereto. The "unavailable" is a state of inhibition in which the repeater device 160 is inhibited from being brought to the "control channel", the "communication channel", and the "idle", and the function of the repeater device 160 is stopped. For example, when judging that it is dangerous to further operate the repeater device 160, the site controller 170 brings the repeater device 160 into the "unavailable" state as an emergency measure, and excludes it from a selection target. Thus, by bringing the repeater device 160 into the unavailable state, it becomes possible to lower the elevated temperature of the repeater device 160. Although not illustrated, in cases where a cooling mechanism (an ordinary stopped cooling mechanism, etc.) is arranged, separately from an ordinary used one, in each of repeater devices 160 or in the interior of the base station 130, upon bringing any one of the repeater devices 160 into the "unavailable" state, the site controller 170 may actuate the cooling mechanism arranged in the one repeater device 160 or the cooling mechanism arranged in the base station 130 so as to cool the repeater device 160 which is brought into the "unavailable" state.

Repeater Device

Figure 3:
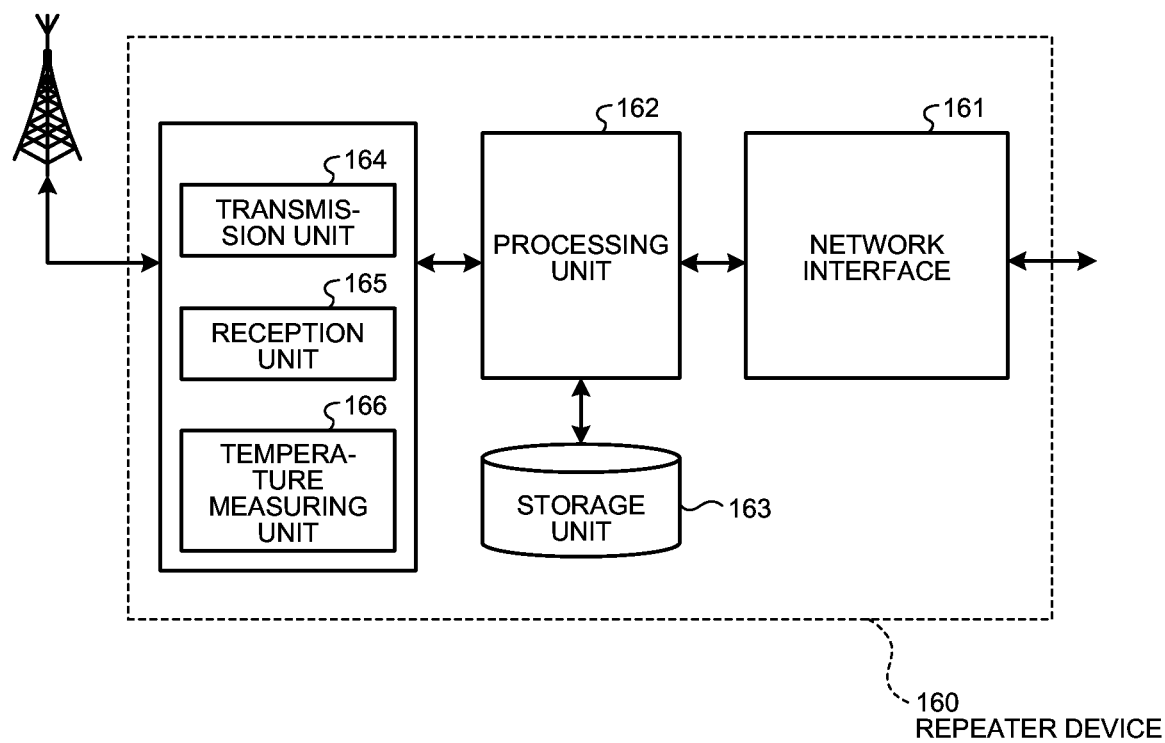
FIG. 3 is a block diagram illustrating an example of a configuration of a repeater device according to the embodiment of the present disclosure.

The configuration of a repeater device will be explained with reference to FIG. 3. FIG. 3 is a block diagram illustrating an example of the configuration of the repeater device.

As illustrated in FIG. 3, a repeater device 160 is provided with a network interface 161, a processing unit 162, a storage unit 163, a transmission unit 164, a reception unit 165, and a temperature measuring unit 166. The configuration of the repeater device 160 illustrated in FIG. 3 is common in all of the first repeater device 160-1 through the third repeater device 160-3. Although not illustrated, the first through the third repeater devices have their respective configurations denoted as, for example in the case of the first repeater device 160-1, a network interface 161-1, a processing unit 162-1, a storage unit 163-1, a transmission unit 164-1, a reception unit 165-1, and a temperature measuring unit 166-1. The same is applicable in the second repeater device 160-2 and the third repeater device 160-3.

The network interface 161 communicates information with external equipment through a network such as an IP network, etc. For example, the network interface 161 communicates information with the other repeater devices 160 and the site controller 170 in the base station 130. In addition, the network interface 161 communicates information with equipment (the system controller 110, other base stations 130, etc.) in the outside of the base station 130 through the router 120. The network interface 161 includes, for example, a network adapter such as a network interface card (NIC), etc.

The processing unit 162 controls the units of the repeater device 160. The processing unit 162 carries out processing based on a request from the outside. The processing unit 162 outputs a request and a result of processing, etc., to the outside as needed. The processing unit 162 includes, for example, a central processing unit (CPU), a random access memory (RAM), a read only memory (ROM), and so on. In this case, computer programs, which are executed by the CPU to control the respective units, are stored in the ROM. The CPU reads out the computer programs stored in the ROM, and executes them with data areas reserved in the RAM, thereby controlling the respective units of the repeater device 160.

The storage unit 163 stores the data to be supplied to the processing unit 162, and the data obtained as the processing result of the processing unit 162. In addition, the storage unit 163 also stores therein the data that the processing unit 162 outputs to the outside through the network interface 161 or the transmission unit 164, and inputs from the outside through the network interface 161 or the reception unit 165. The storage unit 163 includes, for example, a solid state drive SSD), a hard disk drive (HDD), an SD memory card (secure digital memory card), a flash memory, or the like. The storage unit 163 may also include the RAM, the ROM, etc., as mentioned above.

The transmission unit 164 transmits radio waves to an external mobile station 150 through the antenna 180 according to the control of the processing unit 162. At this time, the processing unit 162 controls the transmission unit 164, thereby performing the control of the transmission output (transmission power) of the radio waves, too. The reception unit 165 receives the radio waves transmitted from the external mobile station 150 through the antenna 180, and notifies the processing unit 162 of it.

The temperature measuring unit 166 measures a temperature inside the repeater device 160, and notifies the processing unit 162 of it. That is, the processing unit 162 monitors the temperature inside the repeater device 160 through the temperature measuring unit 166. The temperature measuring unit 166 includes, for example, a temperature measuring instrument, a temperature measuring sensor, a thermometer, other equipment or devices capable of performing temperature measurement, or the like that is arranged in the interior of the repeater device 160. In addition, the temperature measuring unit 166 monitors the radio waves transmitted from the transmission unit 164, and may estimate or evaluate a temperature change inside the repeater device 160 from an increase (a load increase) of the number of transmissions of the radio waves per unit time, etc.

Site Controller

Figure 4:
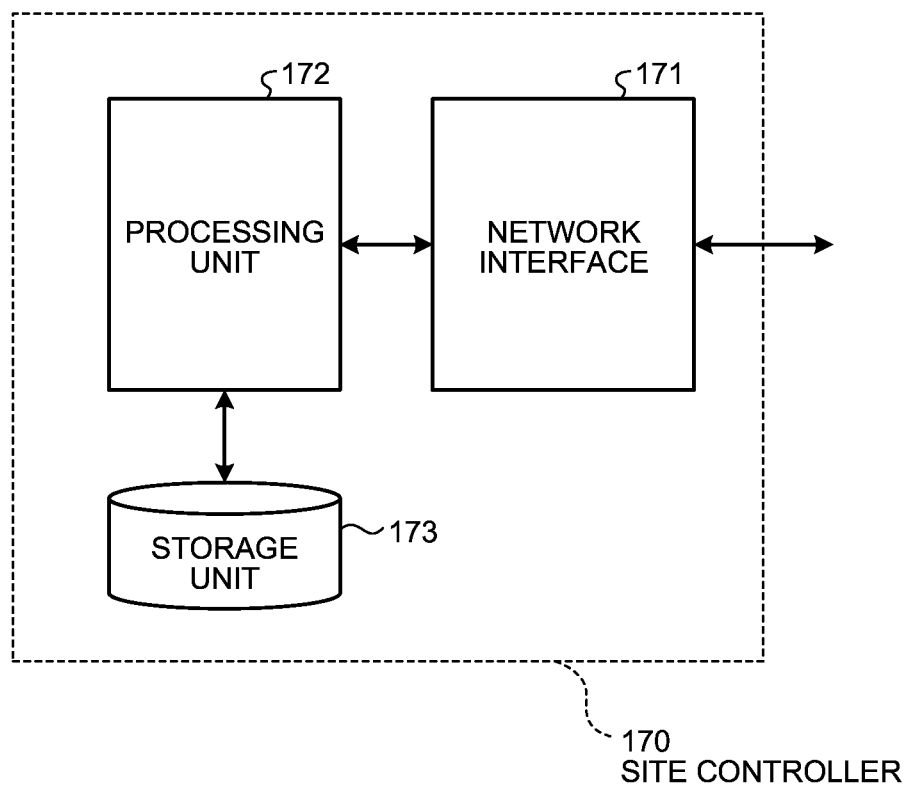
FIG. 4 is a block diagram illustrating an example of a configuration of a site controller according to the embodiment of the present disclosure.

The configuration of a site controller will be explained with reference to FIG. 4. FIG. 4 is a block diagram illustrating an example of the configuration of the site controller.

As illustrated in FIG. 4, a site controller 170 is provided with a network interface 171, a processing unit 172, and a storage unit 173. The configuration of the site controller 170 illustrated in FIG. 4 is common in all the site controllers 170 included in the first base station 130A through the third base station 130C, respectively. Although not illustrated, the site controllers have their respective configurations denoted as, for example in the case of the first base station 130A, a site controller 170A, a network interface 171A, a processing unit 172A, and a storage unit 173A. The same is applicable in the second base station 130B and the third base station 130C.

The network interface 171 communicates information with external equipment through a network such as an IP network, etc. For example, the network interface 171 communicates information with the repeater devices 160 in the base station 130. In addition, the network interface 171 may communicate information with equipment (the system controller 110, other base stations 130, etc.) in the outside of the base station 130 through the router 120.

The processing unit 172 monitors and controls the repeater devices 160 through the network interface 171. The processing unit 172 outputs a request and a result of processing, etc., to the outside as needed. The processing unit 172 includes a CPU, a RAM, a ROM, etc., for example. In this case, computer programs, which are executed by the CPU to control their respective units, are stored in the ROM. The CPU reads out the computer programs stored in the ROM, and executes them with data areas reserved in the RAM, thereby monitoring and controlling their respective repeater devices 160.

The storage unit 173 stores therein the data to be supplied to the processing unit 172, and the data obtained as the processing result of the processing unit 172. In addition, the storage unit 173 also stores therein the data output and input to and from the outside, by the processing unit 172 through the network interface 171. The storage unit 173 includes, for example, an SSD, an HDD, an SD memory card, a flash memory, or the like. Also, the storage unit 173 may include the RAM, the ROM, etc., as mentioned above.

Transition of State Accompanying Temperature Change

The relation between the changes of the temperatures inside repeater devices and the changes of the states of the repeater devices will be explained with reference to FIG. 5 through FIG. 8. FIG. 5 is a diagram illustrating the repeater devices in a normal state. FIG. 6 is a diagram illustrating a state in which the temperature of a repeater device of the control channel is abnormal. FIG. 7 is a diagram illustrating a state in which the control channel is switched to another repeater device. FIG. 8 is a diagram illustrating the restoring of the repeater device having a temperature close to an abnormal temperature.

Here, three repeater devices of the first repeater device 160-1, the second repeater device 160-2, and the third repeater device 160-3 will be explained as an example. Repeater IDs of "1", "2", and "3" are assigned as identification information to the three repeater devices, respectively. For convenience, the repeater ID of the first repeater device 160-1 is set to "1", the repeater ID of the second repeater device 160-2 is set to "2", and the repeater ID of the third repeater device 160-3 is set to "3". However, "1", "2" and "3" are merely exemplary, and do not limit the present disclosure.

In the example illustrated in FIG. 5, each repeater device is still in the normal state, and the first repeater device 160-1 of the repeater ID "1" is in the "control channel" state, the internal temperature of which at this time is "50° C.", and an elapsed time since the state has changed to the current state is "120 minutes". In addition, the second repeater device 160-2 of the repeater ID "2" is in the "communication channel" state, the internal temperature of which at this point time is "40° C.", and an elapsed time since the state has changed to the current state is "5 minutes". For example, when a mobile station 150 starts a call, the second repeater device 160-2 shifts from the "idle" state to the "communication channel" state so as to relay the call of the mobile station 150, whereas when the mobile station 150 being relayed ends the call, the second repeater device 160-2 shifts from the "communication channel" state to the "idle" state. Moreover, the third repeater device 160-3 of the repeater ID "3" is in the "idle" state, the internal temperature of which at this point is "30° C.", and an elapsed time since the state has changed to the current state is "60 minutes". Specifically, the processing unit 162 of each repeater device 160 monitors the temperature inside the repeater device 160 through the temperature measuring unit 166, and notifies the processing unit 172 of the site controller 170 of the temperature inside the repeater device 160 through the network interface 161. Here, note that the processing unit 172 of the site controller 170 may store, in the storage unit 173, and manage the "repeater ID", the "state", the "temperature (degrees C.)", and the "elapsed time after the state change", of each repeater device 160 as illustrated in FIG. 5, such that those elements are associated with one another.

In the example illustrated in FIG. 6, when 5 minutes has elapsed from the normal state illustrated in FIG. 5, the site controller 170 detects that the internal temperature of the first repeater device 160-1 in the "control channel" state becomes "80° C.", and approaches an abnormal temperature. The elapsed time after the state change at this time is "125 minutes". Here, note that for the second repeater device 160-2 and the third repeater device 160-3, there is no change excepting that 5 minutes is added to the elapsed time after the state change.

In the example illustrated in FIG. 7, the site controller 170 changes the state of the third repeater device 160-3 that is in the "idle" state, from the "idle" state into the "control channel" state, and changes the state of the first repeater device 160-1 that approaches the abnormal temperature, from the "control channel" state into the "unavailable" state. At this time, the elapsed times after the corresponding state changes of the first repeater device 160-1 and the third repeater device 160-3 are reset to "0 minutes". Specifically, at the time when the internal temperature of the first repeater device 160-1 in the "control channel" state becomes equal to or higher than "80° C.", the processing unit 172 of the site controller 170 judges that the internal temperature approaches the abnormal temperature, and transmits a request to a processing unit 162-3 of the third repeater device 160-3 through the network interface 171 so as to change the state of the third repeater device 160-3 from the "idle" state into the "control channel" state. At the same time (or thereafter without delay), the site controller 170 transmits a request to the processing unit 162-1 of the first repeater device 160-1 through the network interface 171 so as to change the state of the first repeater device 160-1 from the "control channel" state into the "unavailable" state. In addition, all the site controllers 170 in the system are notified of the information that the state of the third repeater device 160-3 is the "control channel" state and the state of the first repeater device 160-1 is no longer the "control channel" state. Furthermore, this information is informed toward mobile stations 150 from a repeater device 160 in the "control channel" state of a neighboring base station 130. The first repeater device 160-1 to be brought to the "unavailable" state also informs this information to the mobile stations 150, and thereafter shifts from the "control channel" state to the "unavailable" state. Here, note that the reason for first bringing another repeater device 160 to the "control channel" state, informing the information on the other repeater device 160 that is in the "control channel" state to the mobile stations 150, and then bringing the other repeater device to "unavailable" is to secure constantly a repeater device 160 in the "control channel" state as the base station 130 so as to prevent the operation of the repeater device in the "control channel" state from being interrupted, and also to guide the mobile stations 150 to the repeater device 160 in the "control channel" state, without searching for a signal in the "control channel" state.

In the example illustrated in FIG. 8, when 5 minutes has elapsed from the change of the state illustrated in FIG. 7, the site controller 170 confirms that the internal temperature of the first repeater device 160-1 that approaches the abnormal temperature, falls to "60° C.", and changes the state of the first repeater device 160-1 from the "unavailable" state to the "idle" state. Specifically, at the time when the internal temperature of the first repeater device 160-1 in the "unavailable" state becomes equal to or less than "60° C.", the processing unit 172 of the site controller 170 judges that the first repeater device 160-1 can be restored due to the decrease of the temperature thereof, and transmits a request to the processing unit 162-1 of the first repeater device 160-1 through the network interface 171 so as to change the state of the first repeater device 160-1 from the "unavailable" state to the "idle" state.

Temperature Management Process

The flow of processing in a temperature management process of repeater devices by a site controller will be explained with reference to FIG. 9. Here, note that this temperature management process is continuously carried out in a periodic manner until the function of the site controller stops, or until this process ends.

Figure 9:
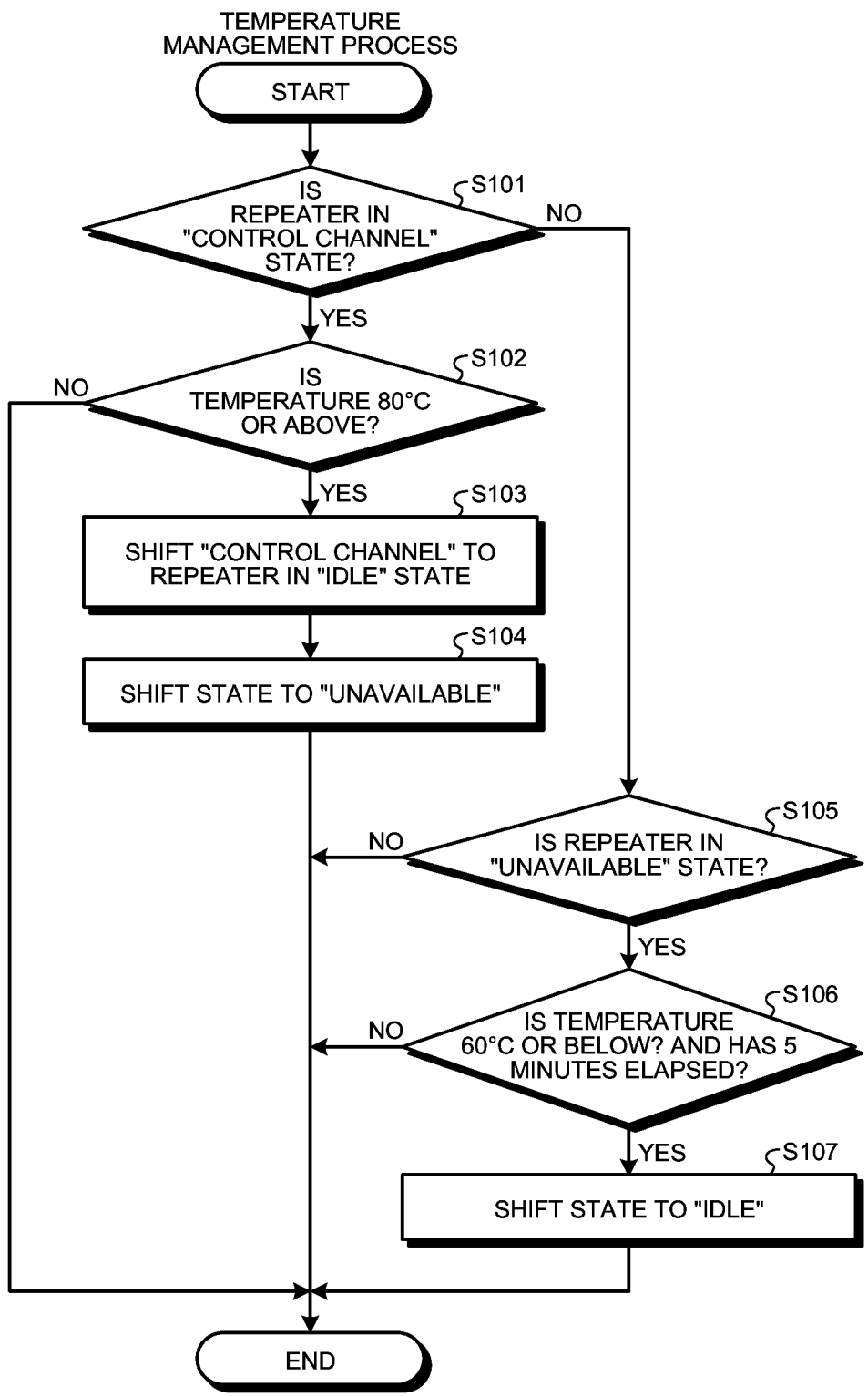
FIG. 9 is a flowchart illustrating an example of the flow of processing in a temperature management process of repeater devices by the site controller.

As illustrated in FIG. 9, in each base station 130, first, a site controller 170 determines whether each of the repeater devices 160 under the control thereof is in the "control channel" state, and specifies a repeater device 160 in the "control channel" state (step S101). In the example illustrated in FIG. 5, the first repeater device 160-1 of the repeater ID "1" is in the "control channel" state.

Subsequently, in cases where the repeater device 160 in the "control channel" state is specified (Yes at step S101), the site controller 170 confirms whether the internal temperature of the repeater device 160 in the "control channel" state is equal to or higher than 80° C. (step S102). In cases where the internal temperature of the repeater device 160 in the "control channel" state is equal to or lower than 80° C. (No at step S102), the site controller 170 performs nothing, but ends a series of processes in this temperature management process, and subsequently, newly starts a series of processes, so as to return to the first processing (the flow returns to step S101). That is, the state and internal temperature of the repeater device are confirmed on a regular basis, and the current state is continued until the state of the repeater device 160 that is in the "control channel" state is switched, or until the internal temperature thereof becomes equal to or higher than 80° C. Here, the temperature that is a criterion (threshold) for detecting that the internal temperature of the repeater device 160 approaches the abnormal temperature due to a temperature rise, is set to "80° C.", but "80° C." is merely an example, and does not limit the present disclosure. The temperature that is the criterion (threshold) can be set optionally. That is, "80° C." may be replaced with a "first temperature threshold" (or a "dangerous temperature threshold"). However, for the purpose of preventing the internal temperature from exceeding the abnormal temperature, the "first temperature threshold" is set to be a lower temperature (a smaller value) than "85° C." that is estimated to be the abnormal temperature.

Then, in cases where the internal temperature of the repeater device 160 in the "control channel" state is equal to or higher than 80° C. (Yes at step S102), the site controller 170 judges that the internal temperature of the first repeater device 160-1 in the "control channel" state approaches the abnormal temperature, and brings the repeater device 160 currently in the "idle" state to the control channel state (step S103). Here, in cases where there exist a plurality of repeater devices 160 in the "idle" state, a repeater device 160 shifts from the "idle" state having the lowest internal temperature to the "control channel" state. In the example illustrated in FIG. 6, the internal temperature of the first repeater device 160-1 currently in the "control channel" state is "80° C.", so it is judged that the internal temperature of the first repeater device 160-1 approaches the abnormal temperature. In addition, the third repeater device 160-3 of the repeater ID "3" is in the "idle" state, so the third repeater device 160-3 shifts from the "idle" state to the "control channel" state. At this time, "the elapsed time (minute) after the state change" of the third repeater device 160-3 is also initialized, and a counted value thereof is reset to "0".

At the same time (or thereafter without delay), the site controller 170 brings the repeater device 160 the internal temperature of which is judged to approach the abnormal temperature to the "unavailable" state (step S104). In the example illustrated in FIG. 7, the first repeater device 160-1 the internal temperature of which is judged to approach the abnormal temperature shifts from the "control channel" state to the "unavailable" state. At this time, "the elapsed time (minute) after the state change" of the first repeater device 160-1 is also initialized, and a counted value thereof is reset to "0". Here, the site controller 170 ends a series of processes in this temperature management process, and subsequently, newly starts a series of processes, so as to return to the first processing (the flow returns to step S101).

In addition, the site controller 170 determines, when the repeater device 160 under the management thereof is not in the "control channel" state (No at step S101), whether the device is in the "unavailable" state (step S105). In cases where a repeater device 160 is neither in the "control channel" state nor in the "unavailable" state (No at step S105), the site controller 170 performs nothing, but ends a series of processes in this temperature management process, and subsequently, newly starts a series of processes, so as to return to the first processing (the flow returns to step S101).

Thereafter, in cases where a repeater device 160 in the "unavailable" state is specified (Yes at step S105), the site controller 170 confirms whether the internal temperature of this repeater device 160 in the "unavailable" state is equal to or lower than 60° C., and whether "5 minutes" has elapsed after the repeater device 160 became the "unavailable" state (step S106). In cases where the internal temperature of the repeater device 160 in the "unavailable" state is higher (more) than "60° C.", and/or in cases where "5 minutes" has not elapsed after the repeater device 160 became the "unavailable" state (No at step S106), the site controller 170 performs nothing, but continues the current state of the repeater device 160 (the flow returns to step S101). Here, the temperature that is a criterion (threshold) for detecting that the repeater device can be restored due to a decrease of its temperature, is set to "60° C.", but "60° C." is merely an example, and does not limit the present disclosure. The temperature, which becomes the criterion (threshold), can be set optionally. That is, "60° C." may be replaced with a "second temperature threshold" (or a "restoration temperature threshold"). However, for the convenience of judging the decrease of the temperature, the "second temperature threshold" is set to a lower temperature (a smaller value) than the "first temperature threshold". In addition, the elapsed time, which is the criterion (the threshold) of "the elapsed time (minute) after the state change", is set to "5 minutes", but "5 minutes" is merely an example, and does not limit the present disclosure. The elapsed time that is the criterion (threshold), can be set optionally. That is, "5 minutes" may be replaced with an "elapsed time threshold".

Subsequently, in cases where the internal temperature of the repeater device 160 in the "unavailable" state is equal to or lower than "60° C.", and "5 minutes" has elapsed after the repeater device 160 became the "unavailable" state (Yes at step S106), the site controller 170 determines that the repeater device 160 in the "unavailable" state can be restored due to the decrease of its temperature, and brings the repeater device 160 in the "unavailable" state to the "idle" state to restore (step S107). Here, the site controller 170 ends a series of processes in this temperature management process, and subsequently, newly starts a series of processes, so as to return to the first processing (the flow returns to step S101). In the example illustrated in FIG. 8, the internal temperature of the first repeater device 160-1 in the "unavailable" state becomes "60° C.", so it is judged that the first repeater device 160-1 can be restored due to the decrease of its temperature. In addition, "the elapsed time (minute) after the state change" after the first repeater device 160-1 became the "unavailable" state is counted as "5 minutes", and hence, it is judged that "5 minutes" has elapsed after the first repeater device 160-1 became the "unavailable" state. Accordingly, the above-mentioned condition is satisfied, so the site controller 170 determines that the first repeater device 160-1 can be restored due to the decrease of its temperature, and brings the first repeater device 160-1 in the "unavailable" state to the "idle" state to restore.

Thus, as restoration requirements of a repeater device that became unavailable due to a temperature rise, it is preferable to employ not only a condition "the decrease of the temperature" but also a condition "the unavailable state continuing for a prescribed period of time or more". In this manner, the repeater device continues the "unavailable" state until a fixed period of time elapses even if the temperature of the repeater device decreases, so as to prevent a case where a frequently temperature rise occurs at a specific repeater device alone, thereby uniformizing the service life of each repeater device.

Moreover, in actuality, the site controller 170 accumulates, for each repeater device 160, a record of "the highest temperature at assignment of the control channel in the past", and stores "the number of times of assignment for each repeater device to the control channel in the past" and "the highest temperature at that time" in a recognizable way, so as to prevent a use of a repeater device having a large number of times of approaching the "abnormal temperature", or to assign such a repeater device to the "communication channel" instead of the "control channel", etc. As a result, it is possible to prevent a case where a frequent temperature rise occurs at a specific repeater device alone, thereby making it possible to uniformize the service lives of the repeater devices, too.

Time Management Process

The flow of processing in a time management process of repeater devices by a site controller will be explained with reference to FIG. 10. Here, note that this time management process is continuously carried out in a periodic manner until the function of the site controller stops, or until this process ends.

Figure 10:
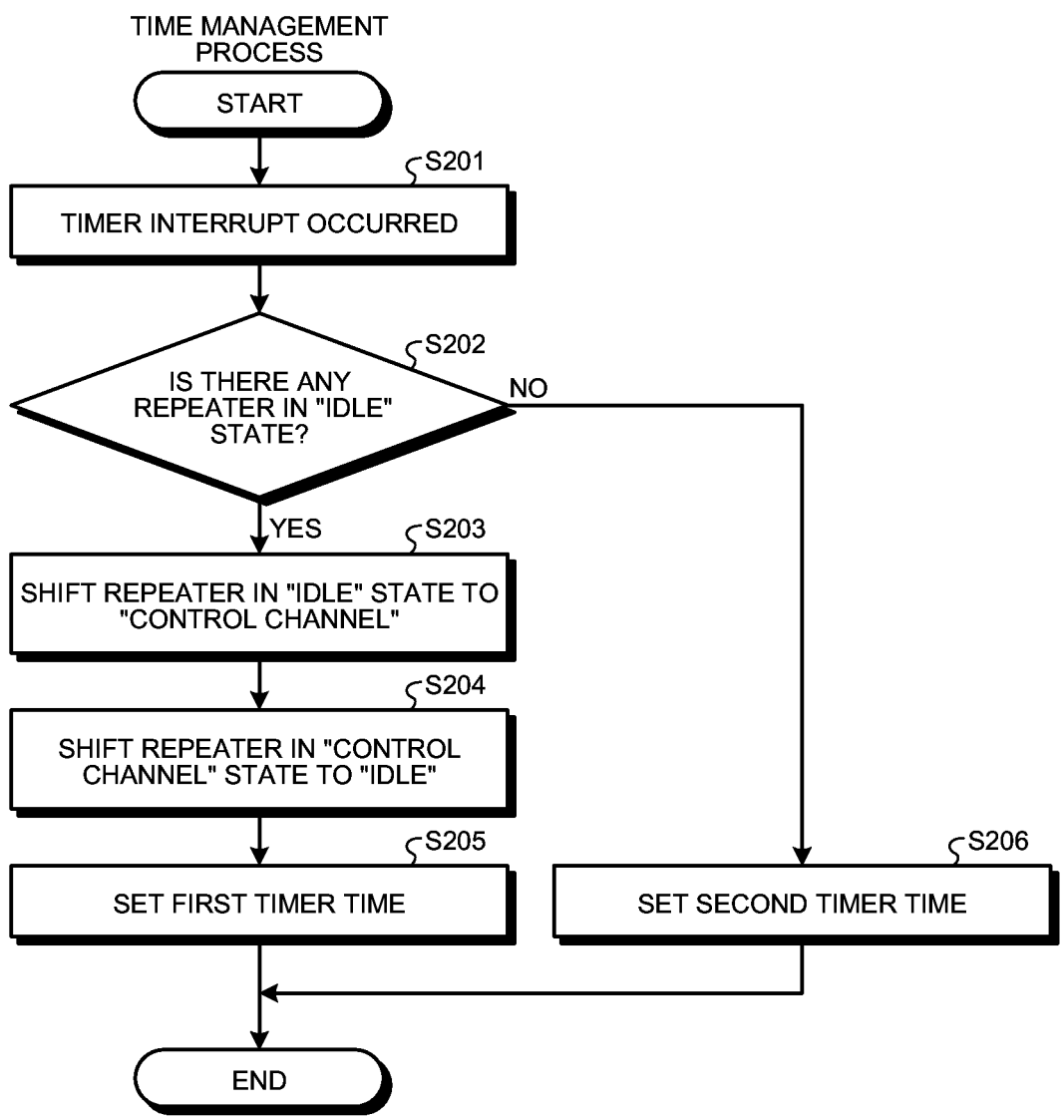
FIG. 10 is a flowchart illustrating an example of the flow of processing in a time management process of repeater devices by the site controller.

As illustrated in FIG. 10, in each base station 130, the site controller 170 first detects that a timer interrupt has occurred (step S201). Here, an initial value of a timer time (interrupt time), which indicates a time interval for performing a timer interrupt, can be optionally set.

Subsequently, in response to a timer interrupt, the site controller 170 confirms, for each of the repeater devices 160 under the control thereof, whether there exists any repeater device 160 in the "idle" state (step S202).

Then, in cases where there exists a repeater device 160 in the "idle" state (Yes at step S202), the site controller 170 brings the repeater device 160 in the "idle" state to the "control channel" state (step S203). For example, in the examples illustrated in FIG. 5 through FIG. 8, the third repeater device 160-3 in the "idle" state shifts to the "control channel" state. Here, in cases where there exist a plurality of repeater devices 160 in the "idle" state, a repeater device 160 in the "idle" state with the lowest internal temperature shifts to the "control channel" state.

At the same time (or thereafter without delay), the site controller 170 brings the repeater device 160 in the "control channel" state at the time of the timer interrupt to the "idle" state (step S204). For example, in the examples illustrated in FIG. 5 through FIG. 8, the first repeater device 160-1 in the "control channel" state shifts to the "idle" state.

Thereafter, the site controller 170 sets a first timer time as a time interval for timer interrupt (step S205). The first timer time can be optionally set. Here, note that in this case, the control channel has already been switched, as mentioned above, so there is no need of hurrying to switch the control channel, and the first timer time should just be a normal time interval. After that, the site controller 170 ends a series of processes in this time management process, and newly starts subsequently, a series of processes, so as to return to the first processing (the flow returns to step S201).

In addition, in cases where there does not exist any repeater device 160 in the "idle" state (No at step S202), the site controller 170 sets a second timer time as a time interval for timer interrupt (step S206). The second timer time can be optionally set. However, in this case, any repeater device 160 in the "idle" state does not exist, and the control channel has not been switched, so it is necessary to hurry to switch the control channel. For that reason, it is preferable that the second timer time be a shorter time (smaller value) than the first timer time. After that, the site controller 170 ends a series of processes in this time management process, and subsequently, newly starts a series of processes, so as to return to the first processing (the flow returns to step S201).

As described above, in this embodiment, a repeater device 160 notifies the site controller 170 of the fact "having approached the abnormal temperature" and the fact "having returned to the normal temperature". When the repeater device 160 having approached the abnormal temperature is in the "control channel" state, the site controller 170 brings this repeater device 160 to the "unavailable" state, inhibits the transmission of radio waves therefrom, and switches the "control channel" to another repeater device 160.

Moreover, when receiving from the repeater device 160 in the "unavailable" state a notification to the effect that this repeater device 160 has returned to the normal temperature, the site controller 170 brings this repeater device 160 from the "unavailable" state to the "idle" state. Here, note that in actuality, the site controller 170 may bring this repeater device 160 not to the "idle" state but to the "communication channel" state. When a restoration condition is further satisfied, e.g., when a sufficient period of time has elapsed, etc., the site controller 170 may again bring this repeater device 160 to the "control channel" state. A threshold (temperature) for switching the control channel according to the temperature can be set optionally by a user. The restoration condition to the control channel includes "temperature" and "the elapse of a fixed period of time from the time of switching the control channel". When switching the control channel according to the temperature, it is preferable to switch to a repeater device 160 of the lowest temperature. In the examples illustrated in FIG. 5 and FIG. 6, the internal temperature of the third repeater device 160-3 in the "idle" state is "35° C.", and is the lowest in comparison with the other repeater devices 160, and thus the repeater device 160 having the lowest temperature is the third repeater device 160-3 in the "idle" state.

In order to prevent the mobile stations (radio communication terminals) under the control of the radio communication system from becoming a hunt state, at the time of switching the control channel according to the temperature, too, as at the time of switching the control channel according to the time, the transmission of the radio waves by the repeater device of the current control channel is stopped, after notifying the mobile stations 150 existing in a current service area 140 of the information of the repeater device of the following control channel by the repeater device of the current control channel after the following control channel is actuated. For factors (conditions) for automatic switching of the control channel, the user can optionally select from "temperature", or "time and temperature", in addition to "time" currently used.

Note that the time management process is, when being carried out simultaneously with the temperature management process, carried out in parallel with the temperature management process. However, it is also possible to carry out the temperature management process alone without carrying out the time management process. To the contrary, it is also possible to carry out the time management process alone without carrying out the temperature management process. Whether any of "the temperature management process", "the time management process", and "both the temperature management process and the time management process" is carried out is selectable on this system.

According to the present disclosure, it is possible to prevent a breakdown or failure of a base station function due to an abnormal temperature rise.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A radio relay apparatus comprising:
a repeater device including a processing unit capable of performing radio communication with a communication terminal, and capable of switching a channel state, and a temperature measuring unit configured to measure a temperature; and
a site controller configured to manage a state of the repeater device, wherein
in cases where the state of the repeater device is a control channel state to control entire communication, and an internal temperature of the repeater device is equal to or more than a first temperature threshold set in advance, the site controller brings the repeater device from the control channel state to an unavailable state.

2. The radio relay apparatus according to claim 1, wherein before bringing the repeater device from the control channel state to the unavailable state, the site controller brings another repeater device that is not set to the control channel state or a communication channel state and is in an idle state that is not the unavailable state, to the control channel state.

3. The radio relay apparatus according to claim 2, wherein the site controller allows the repeater device to notify the communication terminal of the fact that the state of the another repeater device is brought to the control channel state, and thereafter brings the repeater device from the control channel state to the unavailable state.

4. The radio relay apparatus according to claim 1, wherein in cases where the internal temperature of the repeater device in the unavailable state is equal to or less than a second temperature threshold set in advance, and a predetermined time has elapsed after the state of the repeater device is brought to the unavailable state, the site controller brings the repeater device from the unavailable state to the idle state.

5. The radio relay apparatus according to claim 1, wherein when a timer interrupt based on a preset timer time occurs, in cases where among a plurality of repeater devices including the repeater device, there exist repeater devices each in the idle state, the site controller brings a repeater device in the idle state, the internal temperature of which is the lowest, to the control channel state.

6. The radio relay apparatus according to claim 1, wherein when the state of the repeater device changes, the site controller initializes a value of an elapsed time after a change of the state, and starts a new count.

7. The radio relay apparatus according to claim 1, wherein the site controller stores number of times of assignment for the repeater device to the control channel state in the past, and a highest temperature at that time.

8. A temperature control method for a radio relay apparatus, the temperature control method comprising:
- determining whether a state of a repeater device capable of performing radio communication with a communication terminal and capable of switching a channel state is a control channel state to control entire communication;
- monitoring an internal temperature of the repeater device, in cases where the state of the repeater device is the control channel state;
- determining whether the internal temperature of the repeater device is equal to or more than a first temperature threshold set in advance; and
- bringing the repeater device from the control channel state to an unavailable state, in cases where the internal temperature of the repeater device is equal to or more than the first temperature threshold.

* * * * *